(12) United States Patent
Han et al.

(10) Patent No.: US 9,865,883 B2
(45) Date of Patent: Jan. 9, 2018

(54) FUEL CELL ELECTRODES USING HIGH DENSITY SUPPORT MATERIAL

(71) Applicant: Nissan North America, Inc., Franklin, TN (US)

(72) Inventors: Taehee Han, Farmington Hills, MI (US); Ellazar Niangar, Redford, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 491 days.

(21) Appl. No.: 14/181,068

(22) Filed: Feb. 14, 2014

(65) Prior Publication Data

US 2015/0236352 A1    Aug. 20, 2015

(51) Int. Cl.
    *H01M 8/24*      (2016.01)
    *H01M 4/86*      (2006.01)
    *H01M 4/92*      (2006.01)
    *H01M 4/88*      (2006.01)

(52) U.S. Cl.
    CPC ....... *H01M 4/8663* (2013.01); *H01M 4/8828* (2013.01); *H01M 4/925* (2013.01); *H01M 4/881* (2013.01); *H01M 4/8807* (2013.01)

(58) Field of Classification Search
    CPC .. H01M 4/8663; H01M 4/8828; H01M 4/925; H01M 4/8807; H01M 4/881; Y02E 60/50
    USPC .......................................................... 429/452
    See application file for complete search history.

(56) References Cited

U.S. PATENT DOCUMENTS

| | | | |
|---|---|---|---|
| 2004/0067407 A1* | 4/2004 | Sompalli | H01M 4/8605 429/480 |
| 2008/0292943 A1* | 11/2008 | Fongalland | C09D 11/52 429/483 |
| 2013/0022891 A1* | 1/2013 | Chuy | H01M 4/921 429/481 |

* cited by examiner

*Primary Examiner* — Gary Harris
(74) *Attorney, Agent, or Firm* — Young Basile Hanlon & MacFarlane, P.C.

(57) ABSTRACT

Methods of preparing fuel cell electrodes having catalyst with high density catalyst support are provided. One method of fabricating a fuel cell electrode comprises adjusting an active catalyst particle loading to increase catalyst layer thickness to within a desired range.

11 Claims, 6 Drawing Sheets

FUEL CELL ELECTRODES USING HIGH DENSITY SUPPORT MATERIAL

TECHNICAL FIELD

This disclosure relates to the design of fuel cell electrodes using high density support material.

BACKGROUND

Carbon has traditionally been the most common material of choice for polymer electrolyte fuel cell (PEFC) electrocatalyst supports due to its low cost, high abundance, high electronic conductivity, and high Brunauer, Emmett, and Teller (BET) surface area, which permits good dispersion of platinum (Pt) active catalyst particles. However, the instability of the carbon-supported platinum electrocatalyst is a key issue that currently precludes widespread commercialization of PEFCs for automotive applications.

Carbon is known to undergo electrochemical oxidation to carbon dioxide. Despite the fact that the cathode potential is usually significantly higher than the standard potential for carbon oxidation, the actual rate of carbon oxidation is very slow due to a very low standard heterogeneous rate constant. During operation of automotive PEFC stacks, fuel/air mixed fronts are known to occur during stack startup and shutdown. Air usually fills the flow channels when the stack is nonoperational. During startup, the hydrogen fed into the stack displaces the air from the anode flow channels, leading to a mixed fuel-oxidant. These mixed-reactant fronts result in significant electrode polarization. Under these conditions, the PEFC cathode can experience high potentials, corresponding to a significantly higher overpotential for the carbon oxidation reaction. The electrochemical reaction rate constant, which increases exponentially with overpotential, is significantly enhanced during this period. Under these conditions, carbon corrosion is exacerbated.

In a second mechanism, fuel starvation at the anode catalyst sites as a consequence of fuel overutilization or flooding (lack of fuel access to catalyst site) also exacerbates carbon corrosion. In this case, carbon is oxidized to provide protons and electrons in place of the absent fuel.

The adverse consequences of carbon corrosion include (i) platinum nanoparticle agglomeration/detachment; (ii) macroscopic electrode thinning/loss of porosity in the electrode; and (iii) enhanced hydrophilicity of the remaining support surface. The first results in loss of catalyst active surface area and lower mass activity resulting from reduced platinum utilization, whereas the second and third result in a lower capacity to hold water and enhanced flooding, leading to severe condensed-phase mass transport limitations. Clearly, both consequences directly impact PEFC cost and performance, especially in the context of automotive stacks.

SUMMARY

Methods of preparing fuel cell electrodes having catalyst with high density catalyst support are disclosed herein. One method of fabricating a fuel cell electrode disclosed herein comprises determining a volume required to achieve a target catalyst layer thickness, calculating a mass of a high density support required to provide the volume, and determining an active catalyst particle loading based on the mass of high density catalyst support and a target mass of active catalyst material.

Fuel cells, fuel cell stacks, and method of making the same are also provided.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which.

DETAILED DESCRIPTION

Catalyst ink is typically prepared by mixing the catalyst, ionomer and a solvent. The catalyst ink is coated onto both sides of a membrane, or, alternatively, on a surface of two gas diffusion layers. The catalyst ink is dried, and the electrode assembly is completed. As carbon and its various types, including graphite, carbon black and activated charcoal, have been used extensively as catalyst support in fuel cells, manufacturers have optimized the catalyst ink recipes to balance optimization of fuel cell performance and cost.

Catalyst ink is optimized to obtain, for example, the desired catalyst loading in a thin catalyst layer, while providing the requisite amount of ionomer. The role of the ionomer in the catalyst layer is important to the performance of the fuel cell. The ionomer, in conjunction with the dispersing solvent and catalyst support, determine the porosity and proton conductivity of the catalyst layer. The ionomer also determines the ion exchange across the membrane that allows the fuel cell reaction to occur by influencing surface adsorption and gas permeability. The ratio of ionomer to catalyst is an important factor in optimizing fuel cell performance and cost. For example, if the ratio is too high, the electrode will be over-covered with ionomer and oxygen diffusion will be impeded. If the ratio is too low, coverage of the ionomer will be insufficient to provide the requisite ion exchange across the membrane. From an economic standpoint, reducing the amount of ionomer improves fuel cell economics.

Due to the extensive use of carbon-based catalyst in fuel cells, the ratio of ionomer to carbon in catalyst ink preparations is optimized. However, alternatives to carbon-based catalysts are desired due to, for example, the performance issues that arise from carbon corrosion. A viable alternative support should possess high surface area and electron conductivity, in addition to being highly corrosion resistant across the anticipated potential/pH window. Metal oxides can be a viable alternative to carbon. Examples of metal oxides include, but are not limited to, $MnO_x$, CuO, ZnO, $FeO_x$, $Cr_2O_3$, $TiO_2$, $SnO_2$, $Nb_2O_5$, $WO_3$, $In_2O_3$, $Sb_2O_3$, $CeO_2$ and $RuO_2$ and combinations thereof. Alternative catalyst support can be prepared using one or more metal oxides, composite metal oxides or metal oxide alloys to achieve a corrosion resistant support with the requisite surface area and conductivity. The one or more metal oxides, composites, or alloys can be mixed with carbon or other materials known to those skilled in the art of fuel cell catalyst.

The optimal ratio of ionomer depends on many factors, including the type of catalyst used, and in particular, the type of support used. The density, porosity and morphology of the support affects the amount of ionomer needed to obtain optimal coverage and thus, optimal performance.

Figure 1:
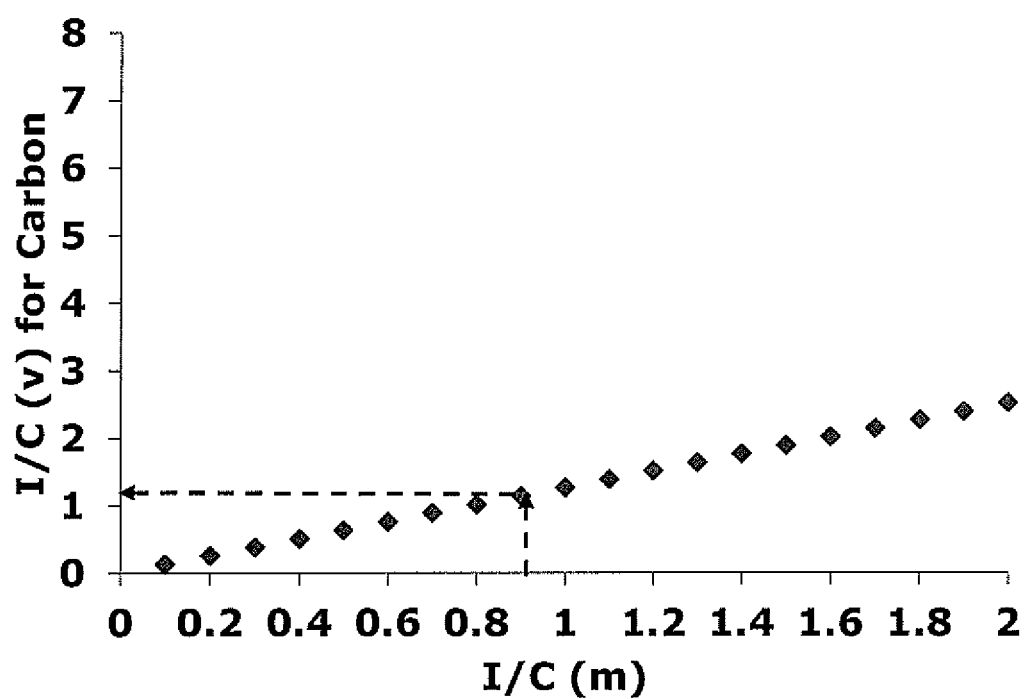
FIG. 1 is a graph comparing the gravimetric ratio of ionomer to carbon to the volumetric ratio of ionomer to carbon for a conventional carbon catalyst.

The methods disclosed herein utilize the extensive performance and cost data available for conventional low density carbon based catalyst ink to prepare an optimized high density support based catalyst ink for use in fuel cell electrodes. FIG. 1 illustrates the relationship between the gravimetric ratio I/C (m) and the volumetric ratio I/C (v) of ionomer I to carbon support C for a conventional carbon support used in fuel cell catalyst. For example, the conventional carbon support can be a spherical porous carbon support having a density of X. Another example of a conventional carbon support may be a rod-shaped carbon support having a different porosity and a density of Y. In either case, the carbon support has been used extensively and catalyst ink using such carbon supports have been optimized. Based on the example in FIG. 1, if a gravimetric ratio I/C (m) of 0.9 was known to be an optimal ratio for the particular carbon support, the catalyst ink would be prepared using a volumetric ratio I/C (v) of 1.14 ionomer I to carbon support C, as shown by the broken line arrows.

It is noted that a gravimetric ratio of 0.9 is provided by means of example and is not meant to be limiting. Catalyst ink and/or fuel cell manufacturers will have established their own optimum gravimetric ratio for carbon based catalyst based on performance and economic data available.

Metal oxides are generally high density materials. As carbon is a low density material, simply replacing metal oxides for carbon when preparing catalyst ink or an electrode using such a catalyst ink can result in reduced oxygen diffusion and flooding of the electrode, for example, because the amount of ionomer used is not optimal. Furthermore, high density metal oxide-containing supports will have a different porosity and morphology than the conventional carbon supports used, further changing the amount of ionomer necessary for optimal fuel cell performance.

Figure 2:
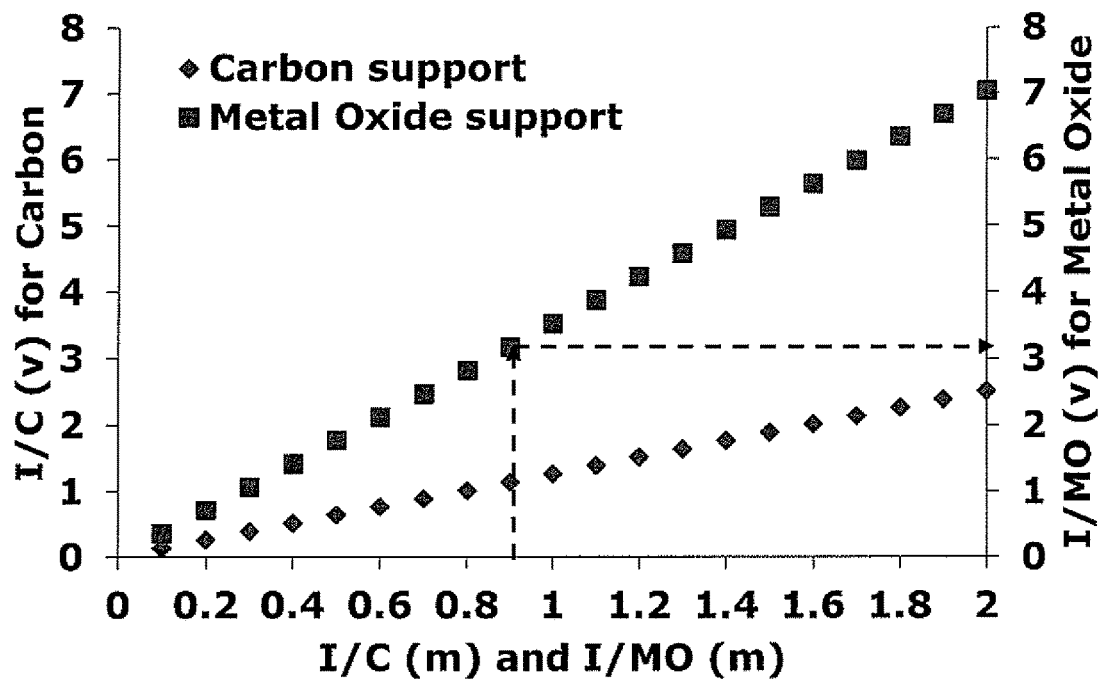
FIG. 2 is a graph comprising the relationship between the gravimetric ratio and the volumetric ratio for catalyst supports having different densities.

FIG. 2 is the graph of FIG. 1 with a second Y-axis added for the volumetric ratio I/MO (v) for a high density metal oxide-containing support MO. The "metal oxide support" line illustrates the relationship between the volumetric ratio I/MO (v) and the gravimetric ratio I/MO (m) for a selected high density metal oxide-containing support MO. The metal oxide line will change depending on the materials of which the support is comprised. If one were to prepare a catalyst ink using a high density metal oxide-containing support using a gravimetric ratio I/MO (m) of 0.9, the volumetric ratio I/MO (v) would be 3.2 due to the higher density and different morphology of the high density support, as illustrated by the broken line arrows in FIG. 2. This significant increase in the volume of ionomer would result in over-coverage of the ionomer, resulting in poor oxygen diffusion and poor fuel cell performance.

Figure 3:
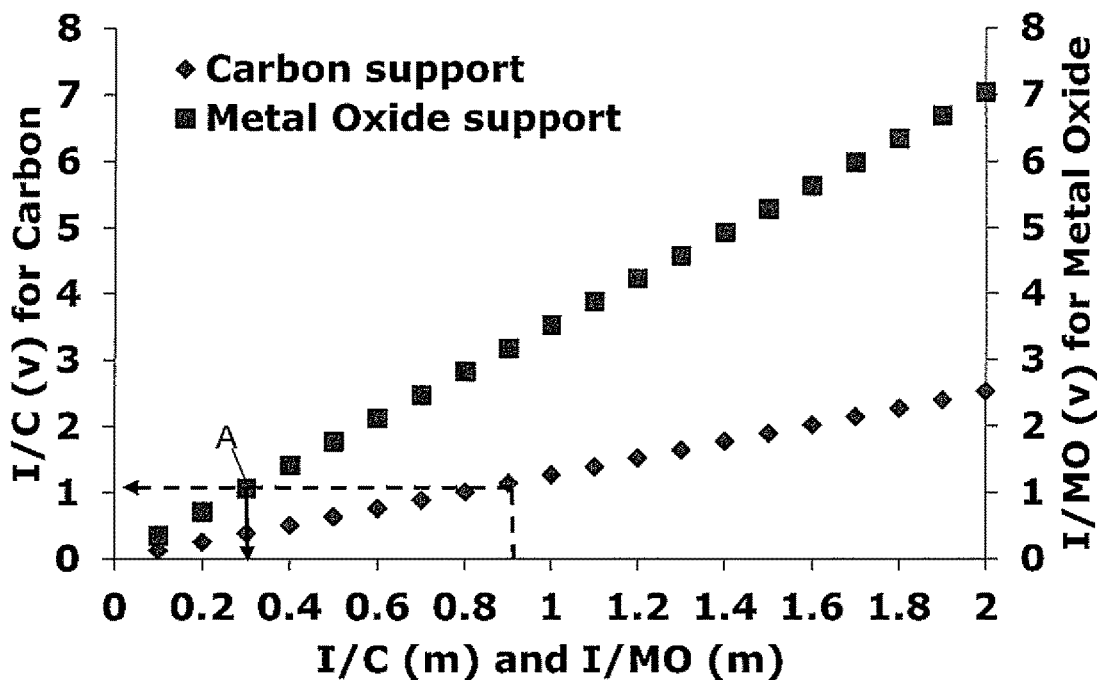
FIG. 3 is the graph of FIG. 2 illustrating its use in a method of preparing an electrode as disclosed herein.
Figure 4:
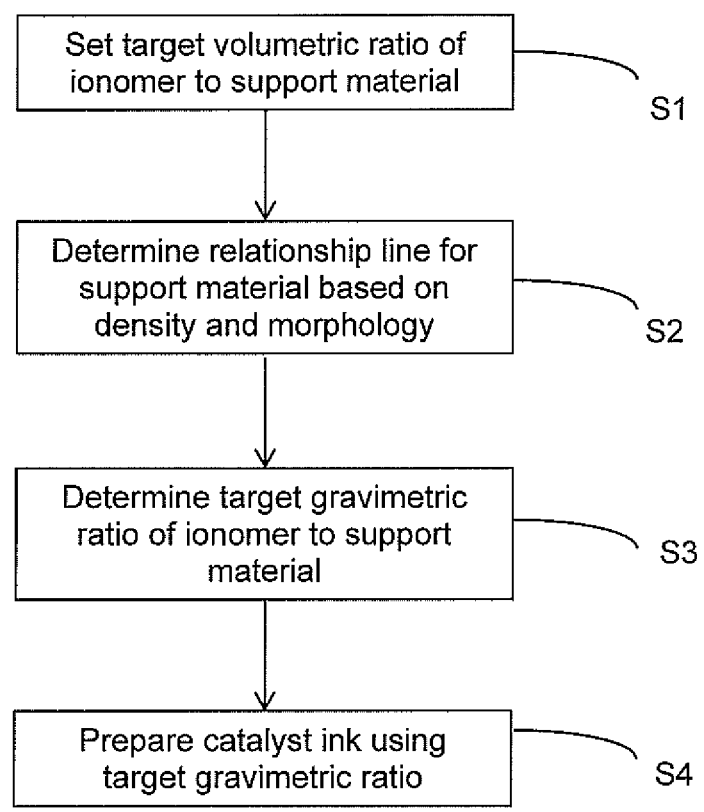
FIG. 4 is a flow diagram of a method of preparing a fuel cell electrode as disclosed herein.

A method of using the support density and morphology to design fuel cell electrodes is disclosed with reference to FIGS. 3 and 4. When preparing a catalyst ink for a fuel cell electrode using a high density support material different than conventional low density carbon, the first step S1 in the method is to set a target volumetric ratio of ionomer to support. As shown by broken line arrows, the target volumetric ratio is set by using the graph in FIG. 3 to determine the volumetric ratio I/C (v) associated with the optimal gravimetric ratio I/C (m) for a reference catalyst support. In the example, the reference catalyst support is carbon support and the target volumetric ratio is 1.14, obtained by following the broken line arrow from the optimal gravimetric ratio I/C (m) of 0.9 to the associated volumetric ratio I/C (v) of 1.14. In step S2, the density and morphology of the support material is used to determine the graph line representing the relationship between the gravimetric ratio I/MO (m) and the volumetric ratio I/MO (v) for the specific high density support material. This relationship line is shown as the "metal oxide support" line in FIG. 3.

In step S3, the target gravimetric ratio I/MO (m) is determined for the high density support material being used. As shown in FIG. 3, the broken line arrow crosses the relationship line for the high density support material MO at point A. The target gravimetric ratio I/MO (m) is determined by locating the position of A on the X-axis, shown by the solid line arrow. In the example shown in FIG. 3, the target gravimetric ratio I/MO (m) is 0.3. In step S4, the catalyst ink is prepared using the target gravimetric ratio I/MO (m) of 0.3 ionomer to high density support material MO. This target gravimetric ratio I/MO (m) will provide the amount of ionomer required based on the density and morphology of the high density support particles to provide optimal fuel cell performance and economics.

Figure 5:
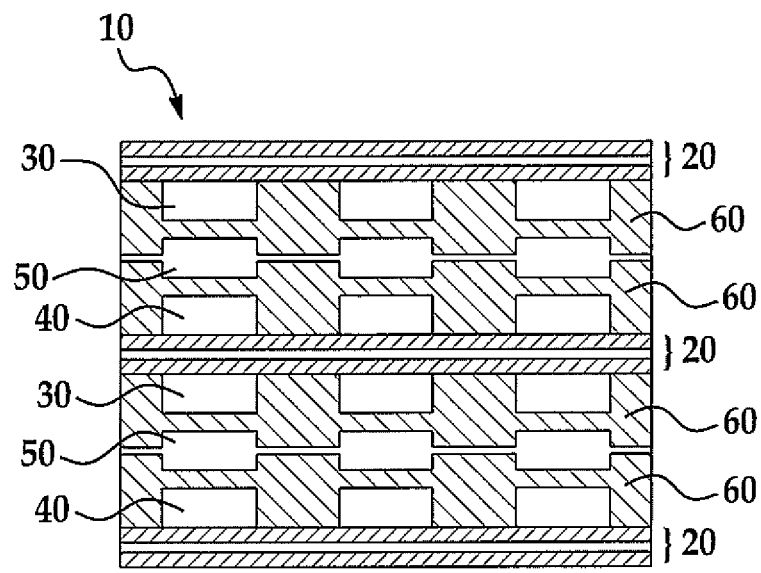
FIG. 5 is a schematic of a fuel cell stack utilizing the electrodes disclosed herein.

The catalyst ink is applied to a substrate for form a catalyst layer. The substrate can be a membrane of a membrane electrode assembly or a gas diffusion layer. FIG. 5 shows a schematic cross-sectional illustration of a portion of a fuel cell stack 10. The illustration is provided as an example and is not meant to be limiting. The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 6:
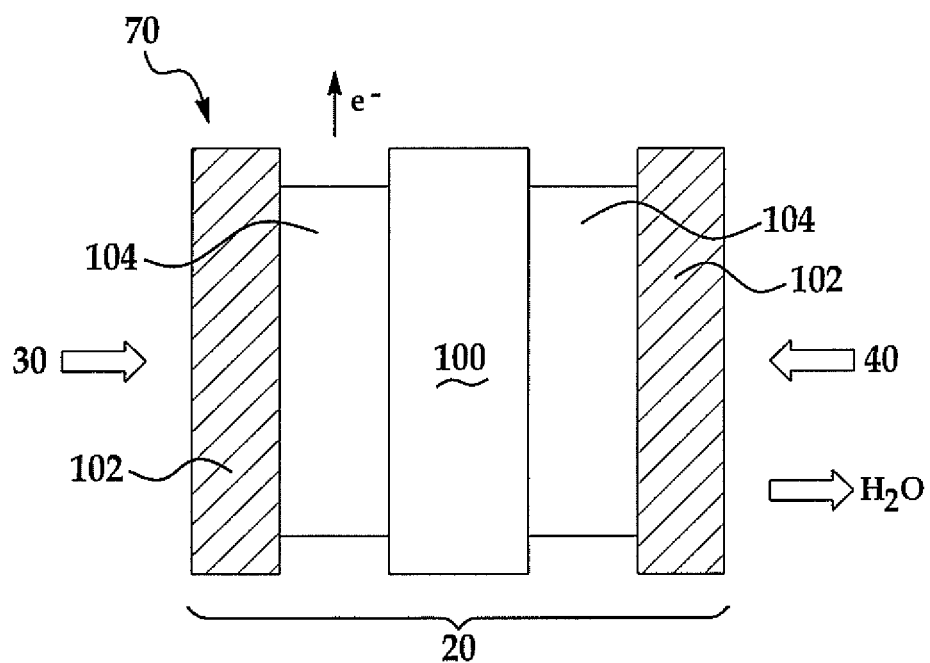
FIG. 6 is a schematic of a fuel cell utilizing the electrodes disclosed herein.

FIG. 6 is an illustration of one of the plurality of fuel cells 70 in the fuel cell stack 10. The fuel cell 70 is comprised of a single membrane electrode assembly 20. The membrane electrode assembly 20 has a catalyst coated membrane 100 with a gas diffusion layer 102 on opposing sides of the membrane 100. The membrane 100 has a catalyst layer 104 formed on opposing surfaces of the membrane 100, such that when assembled, the catalyst layers are each between the membrane 100 and a gas diffusion layer 102. Alternatively, a gas diffusion electrode is made by forming one catalyst layer 104 on a surface of two gas diffusion layers 102 and sandwiching the membrane 100 between the gas diffusion layers 102 such that the catalyst layers 104 contact the membrane 100.

There are multiple variables that are considered in optimizing an electrode for a fuel cell, including but not limited to the type of catalyst, the catalyst activity, the catalyst particle size and the catalyst layer thickness. Fuel cell components, including the catalyst layers, are designed as thin and light as possible to produce small and light-weight fuel cells. However, there are limitations to the thinness of the electrodes, as electrodes less than about 5 µm tend to flood, obstructing mass transport across the fuel cell.

Typical fuel cell catalyst comprises platinum or another noble metal deposited onto the carbon support. To achieve the performance required by the fuel cell, a certain amount of active catalyst particles such as platinum is required. Due to the extensive use of carbon as a catalyst support in fuel cells, the requisite active catalyst particle loading has been optimized when preparing a conventional catalyst ink using conventional carbon support. As a non-limiting example, the carbon-based catalyst is typically made to have a platinum loading of 40 weight %, and the catalyst layer 104 comprised of the carbon-based catalyst will have a resulting thickness of 5 to 10 µm.

Figure 7:
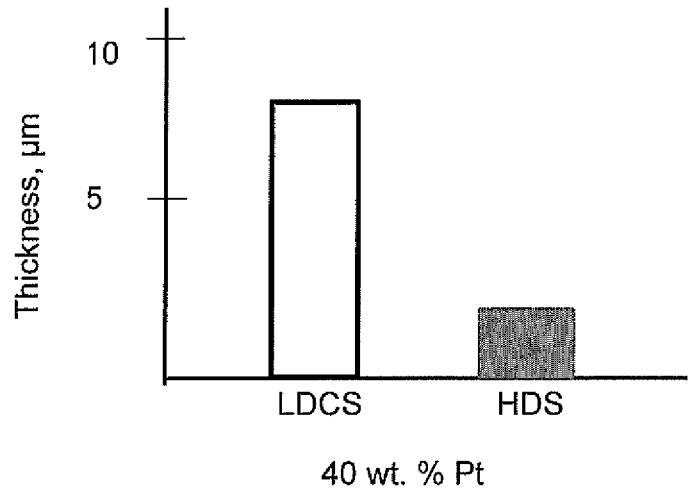
FIG. 7 is a schematic graph comparing catalyst layer thickness of two catalysts with the same active catalyst particle loading but different density catalyst support material.

In general terms, the density of the catalyst support, the active catalyst loading, and the size of the catalyst particles contribute to the thickness of the catalyst layer. Particle size should be as small as possible to provide the greatest surface area, while being large enough to maintain the requisite durability through prolonged use. As shown in FIG. 7, a catalyst having 40 weight % platinum deposited on low density carbon support LDCS will result in a catalyst layer having a thickness of about 8 nanometers, as a non-limiting example.

As noted herein, alternatives to carbon-based catalysts are desired due to, for example, the performance issues that arise from carbon corrosion. Alternative catalyst support can be, for example, one or more metal oxides. The one or more metal oxides can be mixed with carbon or other materials known to those skilled in the art of fuel cell catalyst. The resulting catalyst support is a high density support. A catalyst for a fuel cell was prepared using a high density support HDS with 40 weight % platinum loading. To achieve the requisite catalyst activity based on the catalyst loading, the amount of catalyst required was determined and the catalyst layer was prepared. As shown in FIG. 7, the catalyst layer prepared from the catalyst using the high density support HDS resulted in a catalyst layer having a thickness of less than 5 nanometers. This is due, at least in part, to the high density of the material of the support as compared to the lower density of the carbon support material. To achieve 40 weight % platinum loading using the high density support, a smaller volume of support is required due to the increase of mass per volume of the support. This smaller volume can result in an electrode that is less than 5 nanometers, which will tend to flood, prohibiting mass transport through the cell and negatively affecting performance of the fuel cell.

Figure 8:
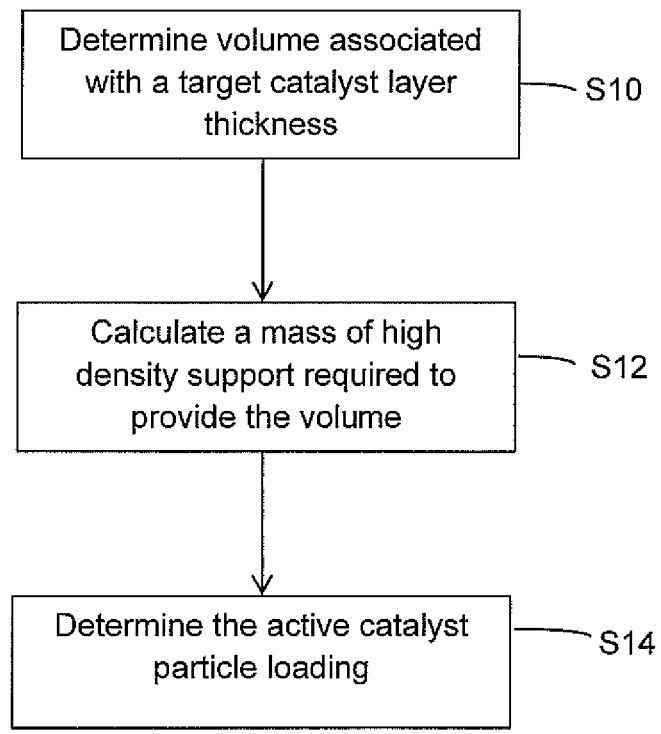
FIG. 8 is a flow diagram of another method of preparing a fuel cell electrode as disclosed herein.

The method provided herein determines an optimal active catalyst loading for high density catalyst support that will result in a fuel cell that has the requisite activity, thickness and durability without increasing costs due to excess active catalyst loading. Referring to FIG. 8, in step S10, a volume that is required to achieve a target catalyst layer thickness is calculated based on the thickness of the layer and the surface area of the substrate on which the catalyst layer is to be formed. Typically, the target catalyst layer thickness will be between about 5 and 15 µm.

Knowing the volume required and the density of the high density material to be used as the catalyst support, a mass of the high density support required to provide the volume can be calculated in step S12. An active catalyst particle loading in percent weight is determined in step S14 based on the mass of high density catalyst support and a target mass of active catalyst material required to achieve a desired catalytic activity.

As a non-limiting example, in step S10, a catalyst layer thickness of 8 µm is selected. A volume is calculated based on the 8 µm thickness and the area of the substrate to be covered by the catalyst. If a metal oxide support consisting of, for example, titanium oxide and ruthenium oxide has a density of 5.6 as compared to a density of 2.0 for carbon support, the mass of the carbon required to fill the volume will be significantly less than the mass of the metal oxide support required to fill the volume. The mass of the high density support required to consume the volume needed is calculated from the density of the high density support in step S12.

It should be noted that the mass of the active catalyst material required to achieve the desired catalytic activity is known. If desired, the mass of the active catalyst material can be converted to a volume of active catalyst material, and this volume can be subtracted from the volume calculated for the catalyst layer. However, an assumption can be made that the volume of active catalyst material is small, and with this assumption, this step can be omitted from the method.

Figure 9:
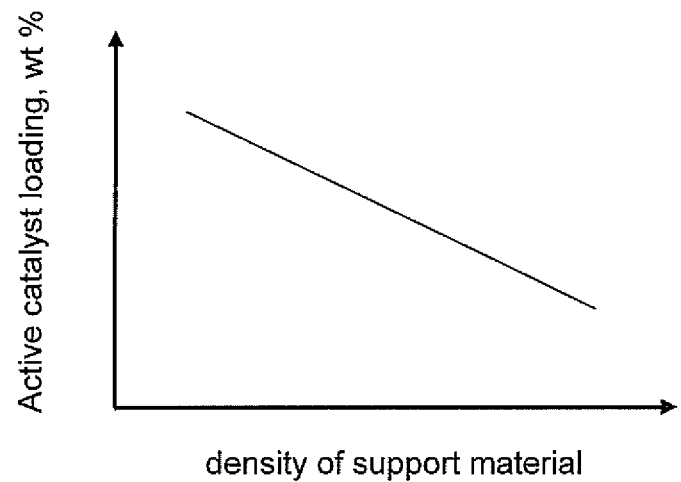
FIG. 9 is a graph illustrating the relationship between active catalyst loading and the density of the catalyst support material used.
Figure 10:
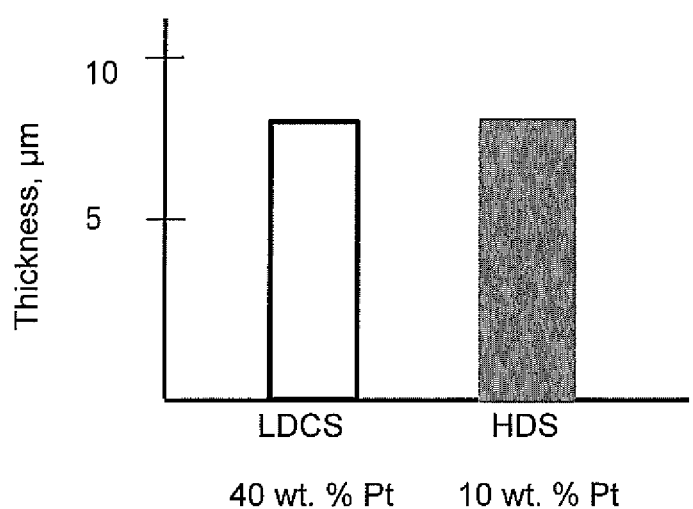
FIG. 10 is a schematic graph comparing catalyst layer thickness of two catalysts with the same catalyst layer thickness and different active catalyst particle loading.

In step S14, the active catalyst loading is determined from the mass of high density catalyst support and the mass of active catalyst material required to produce the desired catalytic activity. As shown in FIG. 9, if the mass of the active catalyst particles required to produce the desired catalytic activity does not change, the active catalyst loading of the catalyst decreases as the density, and thus mass, of the high density support material increases. Therefore, to prepare an electrode having sufficient thickness and the requisite catalytic activity from a catalyst having a high density support, the active catalyst loading decreases. FIG. 10 illustrates an example with the conventional low density carbon support catalyst with 40 wt. % platinum loading forming a catalyst layer of 8 µm. To achieve a catalyst layer of 8 µm with high density support, the platinum loading drops to 10 wt. %.

A catalyst ink is prepared based on the active catalyst loading, and the catalyst ink is coated onto a membrane to the target catalyst layer thickness to prepare the fuel cell electrode.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of fabricating a fuel cell electrode catalyst layer comprising:
    selecting a desired catalytic activity;
    selecting a target mass of active catalyst material required to produce the desired catalytic activity based on a predetermined relationship between mass of active catalyst material and catalytic activity of the active catalyst material;
    selecting a target catalyst layer thickness between 5 µm to 15 µm;

determining a volume of the catalyst layer required to achieve the target catalyst layer thickness, the catalyst layer including metal oxide support particles supporting the active catalyst material, the volume based on the target catalyst layer thickness and a surface area of a substrate to be coated with the catalyst layer;

calculating a mass of the metal oxide support particles required to fill the volume using a density (mass/volume) of the metal oxide support particles;

determining an active catalyst particle loading in weight percent on the metal oxide support particles based on the mass of metal oxide support particles required to fill the volume and the target mass of active catalyst material;

measuring a mass of active catalyst material required to achieve the determined active catalyst particle loading; and preparing a catalyst using the mass of metal oxide support particles and the mass of active catalyst material.

2. The method of claim 1, wherein the metal oxide is selected from $MnO_x$, CuO, ZnO, $FeO_x$, $Cr_2O_3$, $TiO_2$, $SnO_2$, $Nb_2O_5$, $WO_3$, $In_2O_3$, $Sb_2O_3$, $CeO_2$ and $RuO_2$, composites thereof and alloys thereof.

3. The method of claim 1, wherein the metal oxide support particles consists essentially of titanium dioxide and ruthenium dioxide.

4. The method of claim 3, wherein active catalyst particles comprise platinum and the active catalyst particle loading is less than twelve percent.

5. The method of claim 1 further comprising:
preparing a catalyst ink with the catalyst; and
coating the catalyst ink on a membrane.

6. A fuel cell assembly comprising the membrane prepared according to claim 5.

7. A method of manufacturing a fuel cell comprising:
preparing a catalyst ink comprising platinum as an active catalyst material supported on metal oxide support, the preparing comprising:

selecting a desired catalytic activity;

selecting a target mass of the platinum required to produce the desired catalytic activity based on a predetermined relationship between mass of platinum and catalytic activity of the platinum;

selecting a target catalyst layer thickness between 5 μm to 15 μm;

determining a volume of catalyst ink required to achieve the target catalyst ink layer thickness, the volume based on the target catalyst ink layer thickness and a surface area of a membrane to be coated with the catalyst ink;

calculating a mass of the metal oxide support required to fill the volume using a density (mass/volume) of the metal oxide support; and determining a platinum loading in weight percent on the metal oxide support based on the mass of metal oxide support required to fill the volume and the target mass of platinum;

measuring a mass of platinum required to achieve the determined active catalyst particle loading; and mixing the mass of metal oxide support and the mass of platinum to produce catalyst; and mixing the catalyst into a catalyst ink and coating the catalyst ink on the membrane.

8. The method of claim 7, wherein the metal oxide is selected from $MnO_x$, CuO, ZnO, $FeO_x$, $Cr_2O_3$, $TiO_2$, $SnO_2$, $Nb_2O_5$, $WO_3$, $In_2O_3$, $Sb_2O_3$, $CeO_2$ and $RuO_2$, composites thereof and alloys thereof.

9. The method of claim 7, wherein the metal oxide support consists essentially of titanium dioxide and ruthenium dioxide.

10. The method of claim 9, wherein the platinum loading is less than twelve percent.

11. A fuel cell stack comprising a plurality of fuel cells manufactured according to claim 7.

* * * * *